Feb. 19, 1963 J. P. RAFFE 3,077,969

FASTENING DEVICES

Filed Feb. 2, 1961 6 Sheets-Sheet 1

Inventor
JOSEPH PETER RAFFE
By Bacon & Thomas
Attorneys

Inventor
JOSEPH PETER RAFFE
By Bacon & Thomas
Attorneys

Inventor
JOSEPH PETER RAFFE
By Bacon & Thomas
Attorneys

Feb. 19, 1963 J. P. RAFFE 3,077,969

FASTENING DEVICES

Filed Feb. 2, 1961 6 Sheets-Sheet 4

Inventor
JOSEPH PETER RAFFE
By Bacon & Thomas
Attorneys

Feb. 19, 1963 J. P. RAFFE 3,077,969

FASTENING DEVICES

Filed Feb. 2, 1961 6 Sheets-Sheet 5

Inventor
JOSEPH PETER RAFFE
By Bacon & Thomas
Attorneys

Inventor
JOSEPH PETER RAFFE
By Bacon & Thomas
Attorneys 3,077,969
FASTENING DEVICES Joseph Peter Raffe, Chiswick, London, England, assignor to Chiswick Products Limited, London, England, a British company Filed Feb. 2, 1961, Ser. No. 86,758
Claims priority, application Great Britain Feb. 12, 1960
17 Claims. (Cl. 193—38)

This invention is concerned with improvements in or relating to fastening devices, and more particularly fastening devices which are suitable for use in the construction of gravity conveyor chuting, skid plates and like tracked ways along which articles are required to slide or to run, usually under the influence of gravity.

The invention is furthermore concerned with chuting, skid plates and like tracked ways incorporating such fastening devices.

In gravity chuting, skid plates and the like it is important that the strips, rods or tubes which constitute the track inside which or on which the articles are to run shall be so supported on a base or other supporting structure that those parts of their surfaces with which the articles come in contact shall be absolutely free of any projections or hindrances to the free passage of the articles.

In addition gravity chuting, which is widely used for transferring articles or parts to different machines or locations in a factory for instance, must be so constructed that the articles can move not only in a vertical plane but also in a horizontal plane, the path of the chuting obviously depending on the layout of the factory. Such chuting must in effect be tailor made to each factory and in any run of chuting there will nearly always be curves around which the articles travel.

Generally the known chuting is formed of flat strip or rod material which has to be bent to shape, the strips or rods being then secured to supports and being spaced from one another so that any blockage in the run of chuting can readily be seen and rectified by hand.

It has been customary in the construction of gravity chuting to connect the constituent rods or strips to supporting clips or brackets either by welding or by drilling countersunk holes in the rods or strips so that the latter can be attached by bolts and nuts to such clips or brackets, it always being necessary to take care that no part of the welding joint or bolt protrudes beyond the surface of the strip or rod where it might hinder the passage of articles.

This known procedure has inevitably involved lengthy fitting and assembling operations in each case where a run of gravity chuting is required, since each weld or countersunk hole has to be separately made during the construction of the chuting, and furthermore the cross section of the chuting must be substantially uniform throughout its length.

It is one object of this invention to provide an improved fastening device particularly for use in securing rods, tubes or other elongated members to supports which enables such members to be so secured without the need for welding, drilling or machining of the members themselves.

According to one aspect of the invention there is provided a fastening device suitable for use in securing a rod, tube or like elongated member to a support, said device having a groove or slot formed in and extending across an end face thereof, which groove or slot is so shaped in cross section as to permit the device to be threaded onto such an elongated member with part of the peripheral surface of the latter extending proud of the said end face, said device being adapted to be secured to a support and to hold said elongated member firmly in position.

The said fastening device in addition to being threaded onto the elongated member may be constructed with sufficient flexibility to enable it to be snapped onto the elongated member to hold it. This flexibility can be provided for instance by reducing the thickness of the device at the bottom of and along the line of the groove or slot so that when the member and groove or slot are pressed together the sides of the groove or slot spread to receive the member therein and then snap back to their normal position.

In general for gravity chuting, skid plates and like tracked ways the elongated members will be rods or tubes of substantially circular cross section since these can be more readily bent to follow a desired bath, and for use with such elongated members the groove or slot in fastening devices according to the invention will be of a cross section which is a major segment of circle, i.e. the groove or slot will embrace more than half but not the whole of the peripheral surface of the member.

We may also provide fastening devices according to this invention which are threaded at a position remote from said end face so as to be securable to a support by cooperating threaded means. Thus for example one very simple fastening device according to the invention can comprise a bolt grooved across its end face to receive and embrace an elongated member and engageable by a nut to a support through a suitable hole therein. If desired however such devices may have a threaded blind hole in their end opposite the grooved or slotted end to receive for instance an Allen screw or bolt therein to secure them to a support.

Where it is desired to secure the elongated members to a support which is itself of rod like form we may arrange for the device to have an additional groove or slot extending through the end face remote from said first mentioned end face, said remote end face being threaded to receive a nut so that with the intermediary of suitable washers the elongated member can be secured to a rod like support. This additional groove or slot will be so shaped that it can receive the support therein by a simple lateral movement and without the need to thread the device onto the support; thus, for example the additional groove or slot may be straight sided.

Where for example the support is to comprise a pair of spaced rods to which an elongated member is to be secured the fastening device may comprise a bolt like member grooved in one end face to receive the elongated member, an annular washer or like disc mounted on the other end thereof and deformed so as to receive and engage the two spaced rods with the shank of the bolt extending therebetween and an internal or external thread at said other end to receive a further bolt or screw or a nut respectively to lock the device to said spaced rods.

In place of the said annular washer or disc we may in some cases provide a cylindrical sleeve to fit over the bolt like member, one or both end faces of this sleeve being provided with cut out portions in its walls which serve to receive either the elongated member or the support rods. Such sleeves in addition to constituting part of the securing means for the device also serve to strengthen the bolt member particularly in cases where a groove or slot is formed in both ends thereof.

As above indicated fastening devices according to this invention are particularly suitable for securing elongated members to supports to form skid plates, gravity chuting and like tracked ways. It is accordingly within the scope of the invention to provide a skid plate or like tracked way upon which articles can slide, comprising a support or base having one or more elongated members secured thereto by fastening devices as above set forth, the portions of the elongated members which extend proud of the fastening devices serving as the bearing surface upon which articles will slide in use.

According to yet another aspect of the invention there is provided gravity chuting comprising a plurality of bendable rods or tubes arranged in generally parallel and spaced relation to one another to define a track of substantially uniform cross section within which articles can run, said rods or tubes being detachably connected by fastening devices as above set forth to supports spaced along the length of said rods or tubes.

The supports which will in general extend at right angles to the length of the rods or tubes may if desired be of strip material drilled to receive the end of the fastening devices remote from the grooved or slotted end thereof or they may each consist of one or two rods or wires to be secured to the ends of the devices remote from the said grooved or slotted end.

It will be understood that the said supports will be shaped generally to the cross section within the chuting in which the articles are to run and such supports can if desired be prefabricated or where wires or thin rods are used can be cut and bent to shape during erection of a run of chuting.

It will be appreciated that depending on the type of support i.e. strips, single rods or pairs of rods or wires used the type of fastening device used will vary.

The use of fastening devices according to this invention is particularly advantageous as applied to gravity chuting made of rods, tubes or like elongated members since they permit such members to be secured to their supports without the need for any welding or soldering and without the need for any drilling or countersinking through the elongated members as was previously necessary.

Since rod or tube like elongated members are readily bendable to follow a curved path as is often required in gravity chuting it is possible to make stock lengths of chuting comprising say six rods or tubes each secured to a number of supports by fastening devices spaced along their length, so that such lengths can then be drawn from stock, erected, and bent to shape as required.

Since it is important that the passage through the chuting shall be of uniform cross section even around curves, it is desirable to provide a number of removable supports close to one another and loosely engaging all the elongated members in the vicinity of any curves to be made. These supports are sufficiently loosely connected to the elongated members to permit relative sliding movement between the members and the supports when the length of chuting is being bent.

Gravity chuting according to this invention may be of any desired cross section depending on the articles to be conveyed and the shape of the supports and the number of elongated members will vary accordingly.

In order that the invention may be more readily understood, several embodiments of the same will now be described by way of example and with reference to the accompanying drawings, in which.

The fastening devices illustrated can be grouped into three groups. Devices of all these groups are capable of being threaded onto an elongated member by means of a suitably shaped groove or slot in an end face.

Figure 27:
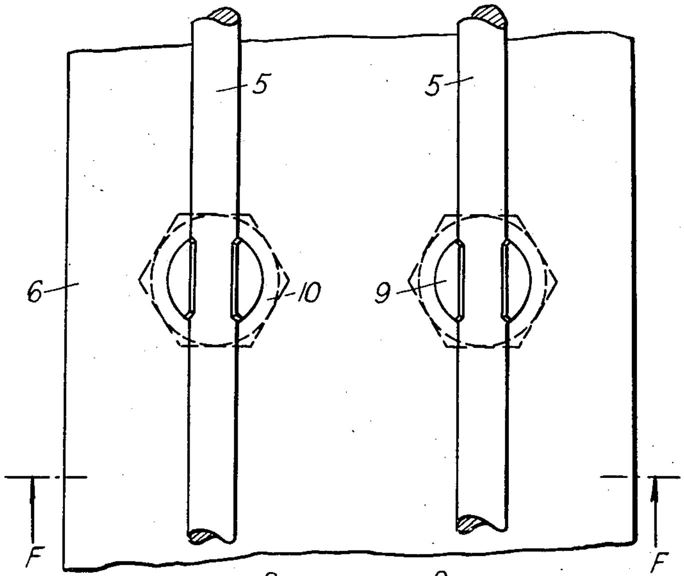
FIG. 27 is a plan view of a skid plate incorporating fastening devices according to the invention.
Figure 28:
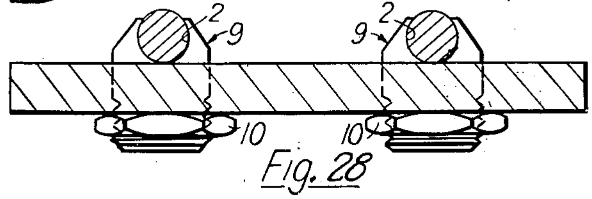
FIG. 28 is a section on the line F—F of FIG. 27.

The first group, illustrated in FIGS. 1 to 10, is suitable to be secured to a support of strip like form such as a metal bracket or strap forming one support of gravity chuting, or may be used for a skid plate as shown in FIGURES 27 and 28.

The second and third groups, illustrated in FIGS. 11 to 26, are respectively suitable to be secured to suitably shaped supports constituting single rods or tubes or pairs of spaced wires, rods or tubes.

Various forms of fastening devices can be provided in the above mentioned first group where the support is in the form of a strip e.g. of metal to which the elongated members are to be secured.

Figure 1:
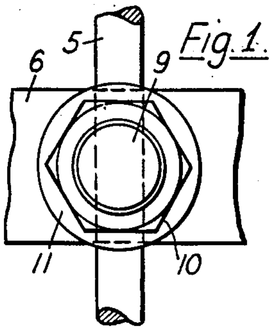
FIGS. 1 to 3 illustrate, in plan, end elevation and side elevation respectively, another embodiment of the invention for securing a rod like member to a support in the form of a strip.
Figure 2:
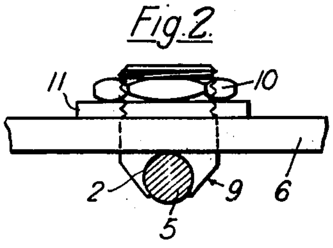
Figure 3:
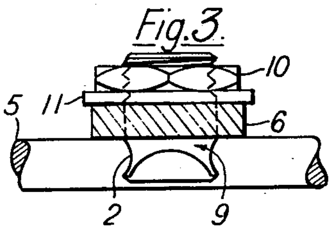
Figure 4:
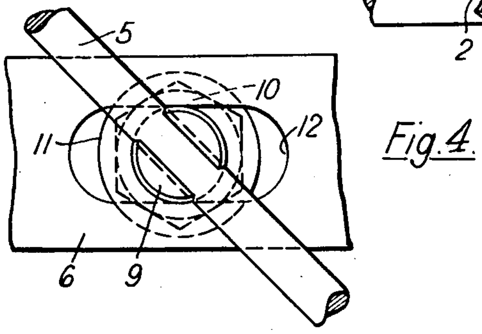
FIG. 4 illustrates an alternative manner in which the embodiment of FIGS. 1 to 3 may be secured to a striplike support.

In one form, shown in FIGS. 1 to 3, a bolt 9 has a groove 2 cut through one end face so as threadably to engage a rod 5 with part of the periphery of the rod exposed. The other end of the bolt is threaded and in use passes through a hole in the strip like support 6 to receive a nut 10 by which the rod 5 and support 6 are secured together. A washer 11 is interposed between the nut 10 and support 6.

FIGURE 2 illustrates an alternative embodiment of the arrangement shown in FIGURES 1 to 3, in which the support 6 is formed with a slot 12 to receive the bolt 9 instead of a cylindrical hole. The advantage of this arrangement is that the rod 5 can be adjusted longitudinally of the strip like support 6 in addition to being angularly adjustable by merely rotating the bolt with respect to the strip 6 before securing it in position. In the embodiment of FIGURES 1 to 3 only the latter angular adjustment is possible.

Figure 5:
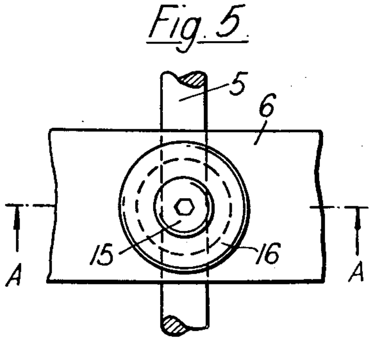
FIGS. 5 and 6 illustrate, in plan and side elevation respectively, an arrangement incorporating a further embodiment of the invention.
Figure 7:
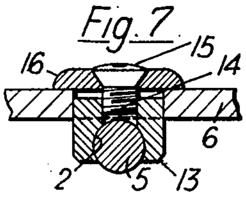
FIG. 7 is a section on the line A—A of FIG. 5.
Figure 6:
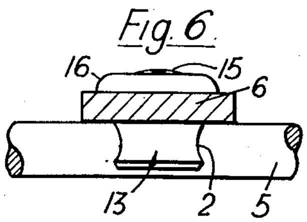

In a second form, shown in FIGS. 5 to 7, the end of a bolt 13 remote from its grooved end enters a hole in the strip like support 6 and has an internally threaded hole 14 therein to receive an Allen screw 15 and washer 16 whereby the rod 5 and support 6 are secured together.

Figure 8:
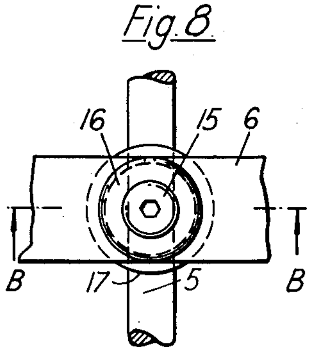
FIGS. 8 and 9 illustrate, in plan and elevation respectively, an arrangement incorporating yet another embodiment of the invention.
Figure 10:
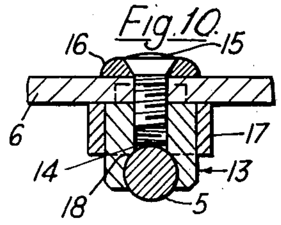
FIG. 10 is a section on the line B—B of FIG. 8.
Figure 9:
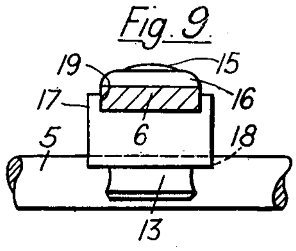

FIGS. 8 to 10 show a third form of this group in which a bolt 13 of the kind shown in FIGS. 5 to 7 is provided with a sleeve 17 which fits over it. One end of this sleeve has arcuate cuts 18 in its wall so that it will seat on the rod 5 engaged by the groove 2 in the bolt 13, and the other end of the sleeve has cut outs 19 in its wall to receive the strip support 6 therein. Again an Allen screw 15 passing through a washer 16 and the hole in the strip support 6 engages the internally threaded hole 14 in the bolt 13 to complete the fastening.

Figure 11:
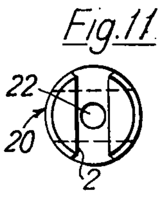
FIGS. 11 to 13 illustrate, in plan, side elevation and end elevation respectively, a bolt constituting yet a further embodiment of the invention.
Figure 12:
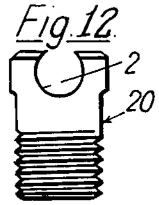
Figure 13:
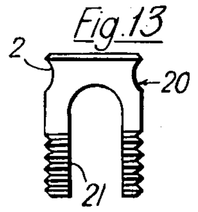

Fastening devices of the second group are suitable for securing elongated members to single rod like supports. A preferred fastening device of this group is shown in FIGURES 11 to 13 and comprises a bolt 20 having a groove 2 forming a major segment of a circle in one end to receive the elongated member. The other end of the bolt is threaded and has a parallel-sided slot 21 extending therethrough which serves to receive the rod like support. It will be understood that the orientation of the groove 2 and slot 20 in the bolt will correspond with the angle (generally a right angle) at which the elongated member and rod like support are to cross one another. Preferably, as may be seen from FIG. 11, the groove 2 and slot 21 intersect one another to form an opening 22 through which an elongated member in the groove 2 and a rod like support in the slot 20 will contact one another and, when forced into close proximity, will be tightly locked together.

Figure 15:
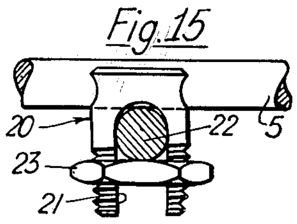
FIGS. 14 to 16 illustrate, in plan, side elevation and end elevation respectively, one arrangement incorporating the bolt shown in FIGS. 11 to 13.
Figure 14:
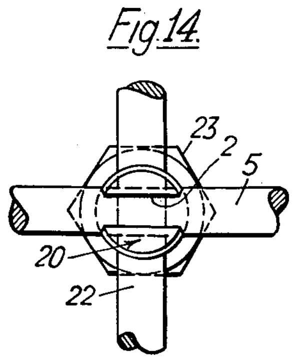
Figure 16:
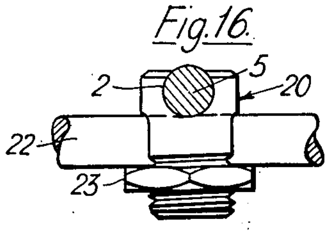

FIGS. 14 to 16 show an arrangement incorporating a bolt of the kind just described, in which an elongated member in the form of a rod 5 is secured to a rod support 22 by means of a bolt 20 and nut 23. As will be seen in FIG. 22 when the nut 23 is tightened down on bolt 20, the nut engages support 22 which is itself locked against rod 5.

Figure 17:
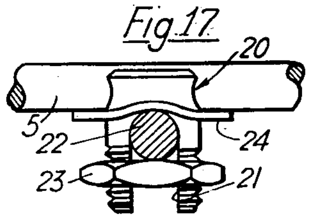
FIGS. 17 and 18 illustrate, in side and end elevation respectively, a modification of the arrangement shown in FIGS. 14 to 16.
Figure 18:
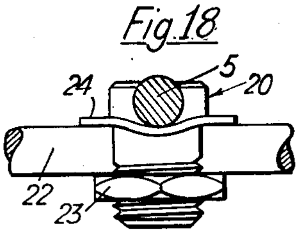

FIGS. 17 and 18 show an arrangement similar to that of FIGS. 14 to 16, in which a flexible washer 24 is situated on the bolt 20 between the rods 5 and 22. In this embodiment it is not necessary for the groove 2 and slot 21 to intersect, as relative movement of the rods is prevented by their frictional engagement with the washer 24. Relative angular movement of the rods 5 and 22 is also prevented by the washer 24 slightly embracing the surfaces of the rods.

Figure 20:
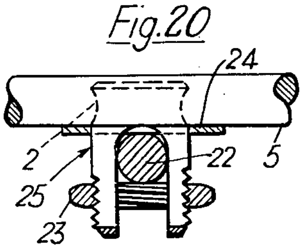
FIG. 20 is a section on the line C—C of FIG. 19.
Figure 19:
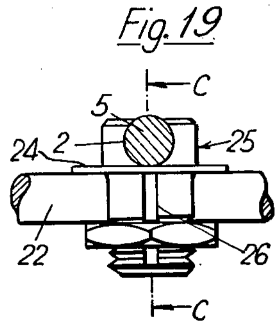
FIG. 19 illustrates, in end elevation, the arrangement of FIGS. 14 to 16 incorporating a modified bolt.

In FIGS. 19 and 20 an arrangement similar to that of FIGS. 14 to 16, but incorporating a modified bolt 25, is illustrated; the bolt 25 is formed with a sawcut 26 extending from groove 2 to a point adjacent the other end of the bolt. This sawcut enables the bolt to be readily disengaged from the elongated rod member 5 by movement in a direction transverse to the axis of the latter instead of having to be threaded off the rod, a washer 24 being provided to prevent the bolt 25 from becoming detached in use. This property is of great utility when it is desired to twist and bend comparatively long portions of chuting to shape, as in these circumstances it is usually desirable first to secure the elongated members and supports of the chuting together with a large number of loosely secured fastening devices so as to maintain the proper cross sectional area within the elongated members during such twisting or bending. When the twisting or bending operation, which can be through as much as 180°, has been accomplished it is undesirable that it should be necessary to unthread the fastening devices from the elongated members in order to remove the excess supports, particularly as some fastening devices must of necessity be left in position. The ability of the fastening device of this embodiment to be removed from an elongated member by a simple movement in a direction transverse to the axis of the latter is thus very advantageous.

Figure 21:
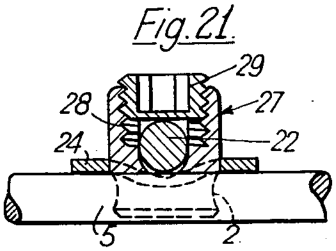
FIG. 21 is a transverse cross section through an arrangement similar to that of FIGURES 14 to 16 but illustrating a further modification of the bolt used therein.

FIG. 21 shows an arrangement similar to that illustrated in FIGS. 17 and 18, but having a modified bolt 27 having an internally threaded slot 28 at its end opposite to the groove 2, a screw 29 being engaged in the bolt to secure the rods 5 and 22 together.

Figure 22:
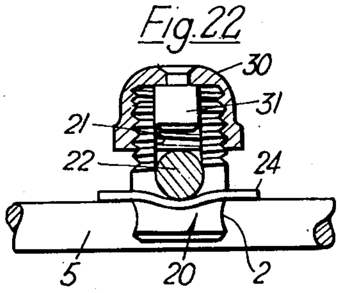
FIG. 22 is a section through yet another arrangement of the kind shown in FIGURES 14 to 16, incorporating a modified bolt.
Figure 23:
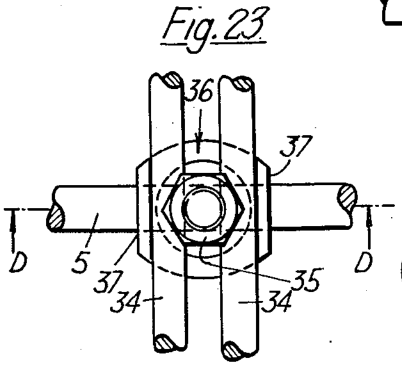
FIG. 23 illustrates, in plan, an arrangement incorporating yet another embodiment of the invention in which a rod like member is secured to a pair of supports.
Figure 24:
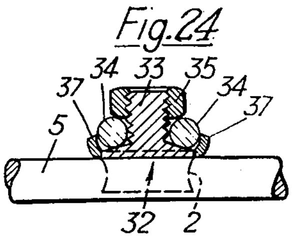
FIG. 24 is a section on the line D—D of FIGURE 23.

FIG. 22 shows an arrangement again similar to that of FIGURES 17 and 18, but in which a domed nut 30 is provided, the nut 30 being furnished with an internal spigot 31 adapted to extend into the slot 21 and prevent collapse of the side walls of the latter when the nut 30 is tightened.

Fastening devices of the above mentioned third group serve to secure elongated members to supports in the form of two spaced wires or rods. In the example shown in FIGS. 23 and 24, a bolt like member 32 has a groove 2 in one end to engage the elongated member 5. The other end of the bolt 32 has an externally threaded portion 33 to pass between the two support rods or wires 34, and to receive a nut 35. A washer 36, having upturned edge portions 37 to embrace and hold the rods or wires 34, is situated between the latter and the elongated member 5.

Figure 25:
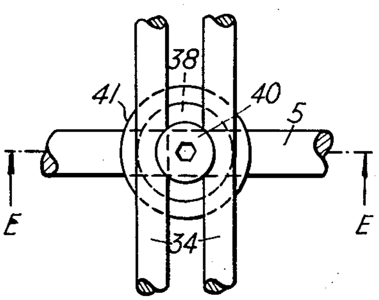
FIG. 25 illustrates, in plan, an arrangement incorporating a further embodiment of the invention.
Figure 26:
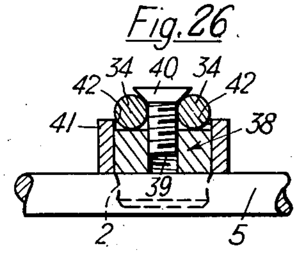
FIG. 26 is a section on the line E—E of FIGURE 25.

In another embodiment of the above mentioned fourth group, illustrated in FIGURES 25 and 26, a bolt like member 38 has a groove 2 in one end to engage an elongated rod member 5, and an internally threaded blind hole 39 in its other end; a pair of support rods or wires 34 engage the end of the bolt 38 and are secured in position by a screw 40 and a sleeve 41 formed with cut outs 42 to embrace the rods or wires.

FIGS. 27 and 28 illustrate a skid plate in which a support or base 6 is secured to elongated members or skid rails 5 by means of fastening devices of the kind hereinbefore described in connection with FIGURES 1 to 3 of the drawings, the washers 11 being, however, omitted.

Figure 29:
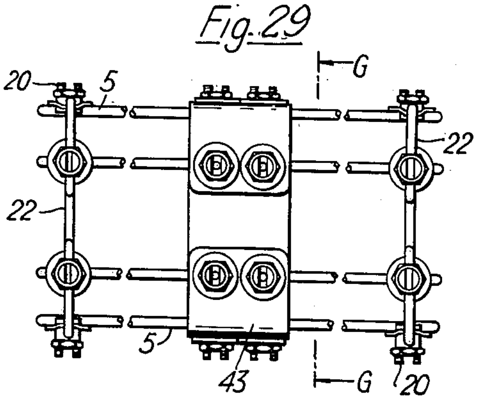
FIG. 29 is a front elevation of a portion of gravity chuting incorporating fastening devices according to the invention.
Figure 30:
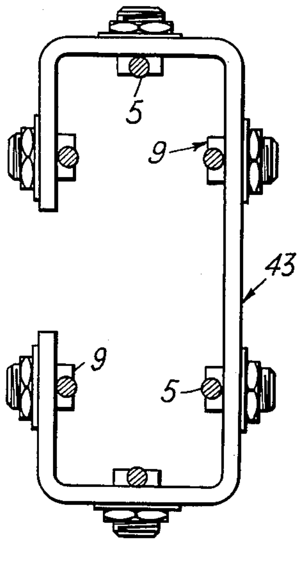
FIG. 30 is a section on the line G—G of FIG. 29.

FIGS. 29 and 30 show a simple form of gravity chuting useful for conveying tin lids or bodies and comprising six elongated rod members 5 arranged in uniform spacing around a C-shaped space. The two members at each end of the C define a gap between them which permits immediate access all along the length of the chuting to relieve any blockage due to a deformed article. In this chuting the supports 22 in the form of bent rods are of C shape and extend around the outside of the six elongated members 5 to hold the latter in position. The supports 22 and elongated members 5 are connected to one another by fastening devices of the kind shown in FIGS. 17 and 18 described above.

FIGS. 29 and 30 also illustrate the manner in which one length of chuting can be connected to another such length by means of a strip like connection 43 adapted to receive opposed ends of the two lengths of chuting, the sleeve having an open side through which a surface of the individual elongated members 5 will be exposed to provide a continuous run for articles. To connect the sleeve 43 to the elongated rod members 5, fastening devices of the kind shown in FIGS. 1 to 3 are employed.

Figure 31:
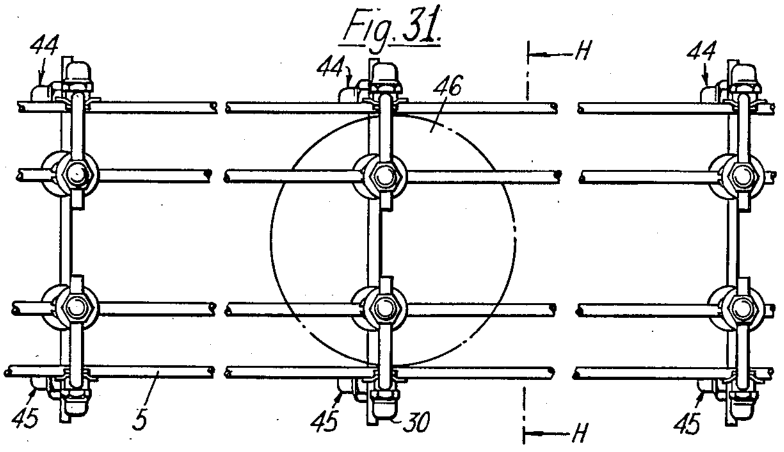
FIG. 31 is a front elevation of another construction of chuting incorporating fastening devices according to the invention.
Figure 32:
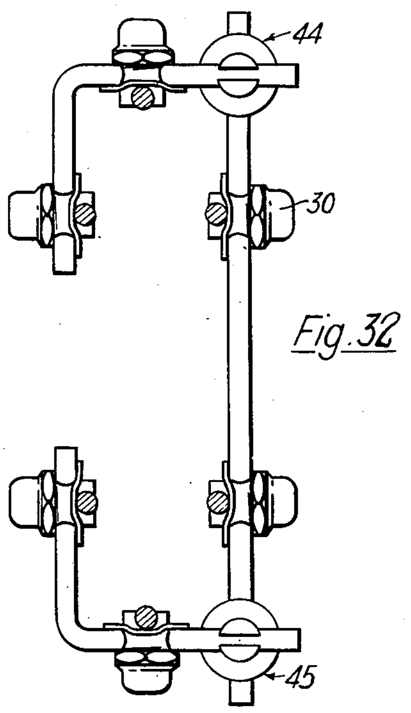
FIG. 32 is a section on the line H—H of FIG. 31.

FIGS. 31 and 32 illustrate another form of gravity chuting which differs from that shown in FIGURES 29 and 30 in that the C-shaped supports are each formed in three parts so that the cross sectional dimensions of the chuting may be adjusted simply by slackening off the fastening devices 44 and/or 45 which serve solely to connect the three parts of the support together, whilst further fastening devices are used to carry the elongated members 5 which form the chute. Fastening devices of the kind shown in FIGURE 29 are made use of in this embodiment, and a work-piece 46 in the form of a circular tin is shown in dot-and-pick lines in FIG. 31. It will be understood that if desired devices such as those shown in FIGS. 14 to 19 could be used in place of the devices of FIGURE 22.

It will be seen that improved fastening devices of simple construction are provided which can be very cheaply mass produced and which whilst having many uses are especially useful in the construction of gravity chuting, skid plates and like tracked ways. It will be apparent that many modifications and variations can be made in the fastening devices above described without departing from the scope of the invention. Thus for example the cross section of the groove or slot therein whilst generally in the form of a major segment of a circle may be varied dependent on the section of the elongated member or part thereof to make threaded engagement therein.

I claim:

1. A gravity chute comprising a plurality of elongated bendable members arranged in generally parallel and spaced relationship to one another to define a trackway of uniform cross-section within which articles can run, and supports for said members spaced along the length thereof, fastening devices detachably connecting said members to said supports each said fastening device having a groove formed in and extending across an end face thereof which groove is so shaped in cross-section as to embrace one of said members with part of the peripheral surface of the latter extending proud of the said end face, said device being formed with a screw-thread at a position remote from said end face and secured thereby to one of said supports to hold said member firmly in position.

2. A chute as defined in claim 1 wherein each of said devices includes a transverse slot across said screw threads and straddling one of said supports.

3. A chute as defined in claim 2 wherein said transverse slot is so shaped that said device may be applied to or removed from said support by movement transverse thereto.

4. A chute as defined in claim 2 wherein said groove and slot at least partially intersect each other so that said members and supports make contact with each other.

5. A chute as defined in claim 2 wherein said devices each include a domed nut engaging said screw thread, and an axial projection in said nut projecting into said transverse slot and engaging the sides thereof.

6. A chute as defined in claim 1 including a slit in each device opening into said groove and lying in the same plane as the axis thereof.

7. A chute as defined in claim 1 wherein each support comprises a plurality of rod-like elements defining the desired cross-sectional shape of the chute, said rod-like elements being adjustably connected together whereby the said cross-sectional shape may be varied.

8. A chute as defined in claim 1 wherein said screw-thread comprises an externally threaded bolt portion at the end of said device remote from the end having said groove.

9. A chute as defined in claim 1 wherein said screw-thread comprises an internal thread in a bore in said device extending inwardly from the end thereof remote from said groove.

10. A chute as defined in claim 1 including a sleeve surrounding said device and having cutouts at its opposite ends partially embracing said member and said supports.

11. A chute as defined in claim 1 wherein said support comprises a pair of parallel rods, said screw thread comprising an externally threaded bolt portion of said device extending between said rods, a washer on said bolt portion between said member and said rods and having laterally bent opposed edge portions engaging the outer surfaces of said rods.

12. A chute as defined in claim 1, wherein said support comprises a pair of parallel rods, said screw thread comprising an internally threaded portion of said device extending between said rods, a sleeve on said bolt portion between said member and said rods, one end of said sleeve having cutout portions at least partially embracing said rods.

13. A fastening device for use in securing an elongated member to a support; said device having a groove formed in and extending across an end face thereof, which groove is so shaped in cross-section as to permit the device to embrace said elongated member with part of the peripheral surface of the latter extending proud of the said end face, the device being formed with a screw-thread at a position remote from said end face and being formed with a transverse slot extending through the threaded portion of the device for the reception of said support, whereby the device may be secured to the latter.

14. A device as defined in claim 13 wherein said transverse slot is so shaped that said device may be applied to or removed from said support by movement transverse thereto.

15. A device as defined in claim 13 wherein said groove and slot at least partially intersect whereby a member in said groove and a support in said slot may contact each other.

16. A device as defined in claim 13 including a slit in said device opening into said groove and lying in the same plane as the axis thereof.

17. A device as defined in claim 13 including a domed nut engaging said screw thread, and an axial projection in said nut projecting into said transverse slot and engaging the sides thereof.

References Cited in the file of this patent

UNITED STATES PATENTS

| | | |
|---|---|---|
| 202,177 | Koehler et al. | Apr. 9, 1878 |
| 381,137 | Hodges | Apr. 17, 1888 |
| 940,680 | Farmilo | Nov. 23, 1909 |
| 1,626,242 | Lanza | Apr. 26, 1927 |
| 1,630,345 | Lanza | May 31, 1927 |
| 1,647,665 | Riche | Nov. 1, 1927 |
| 1,677,764 | Gloekler | July 17, 1928 |
| 1,703,773 | Lee | Feb. 26, 1929 |
| 2,278,193 | Discher | Mar. 31, 1942 |
| 2,441,913 | Taylor | May 18, 1948 |
| 2,720,302 | Madden | Oct. 11, 1955 |
| 2,861,666 | Madden | Nov. 25, 1958 |
| 2,896,762 | Stansbury | July 28, 1959 |